United States Patent
Shank et al.

[19]

[11] Patent Number: 5,811,967
[45] Date of Patent: *Sep. 22, 1998

[54] EGR VALVE LINEAR POSITION SENSOR HAVING VARIABLE COUPLING TRANSFORMER

[75] Inventors: David W. Shank, Big Rapids; Timothy J. Rigling, Reed City, both of Mich.

[73] Assignee: Nartron Corporation, Reed City, Mich.

[ * ] Notice: The term of this patent shall not extend beyond the expiration date of Pat. No. 5,036,275.

[21] Appl. No.: 169,771

[22] Filed: Dec. 17, 1993

Related U.S. Application Data

[63] Continuation-in-part of Ser. No. 69,127, May 28, 1993, abandoned, which is a continuation of Ser. No. 296,183, Jan. 11, 1989, Pat. No. 5,216,364.

[51] Int. Cl.$^6$ .............................. G01B 7/14; H01F 21/02; G08C 19/06; G08C 19/12
[52] U.S. Cl. ................................. 324/207.24; 324/207.22; 123/612
[58] Field of Search .......................... 324/207.11, 207.15, 324/207.16, 207.17, 207.22, 207.24, 226; 340/870.31, 870.32, 870.33, 870.34, 870.35, 870.36; 336/30, 45, 73, 77, 84 R, 130, 132, 133, 136; 123/612, 571

[56] References Cited

U.S. PATENT DOCUMENTS

| | | |
|---|---|---|
| 2,911,632 | 11/1959 | Levine et al. . |
| 3,001,183 | 9/1961 | McKenney et al. . |
| 3,020,527 | 2/1962 | MacLaren . |
| 3,030,574 | 4/1962 | Nissenon . |
| 3,181,055 | 4/1965 | Bischof . |
| 3,654,549 | 4/1972 | Maurer et al. . |
| 3,821,652 | 6/1974 | Wiebe et al. . |
| 3,890,607 | 6/1975 | Pelenc et al. . |
| 3,891,918 | 6/1975 | Ellis . |
| 3,982,189 | 9/1976 | Brooks et al. . |
| 3,995,222 | 11/1976 | Mitarai . |
| 4,181,944 | 1/1980 | Yamauchi et al. ................. 364/431.06 |
| 4,358,762 | 11/1982 | Wolf et al. . |

(List continued on next page.)

FOREIGN PATENT DOCUMENTS

| | | |
|---|---|---|
| 2914083 | 10/1979 | Germany . |
| 3603950 | 8/1987 | Germany . |
| 1232931 | 1/1989 | U.S.S.R. . |
| 2021770 | 12/1979 | United Kingdom . |

OTHER PUBLICATIONS

William Brenner, Magnetostucutive LDTs are Precise, Built Tough, Instrumentation & Communcation Systems, Sep. 1989, pp. 45–47.

M.J. Hower et al. "The New Navistor T444E Direct–Injection Turbocharged Diesel Eng," SAE Tech Paper Series No. 930269.

Terrence Lynch, "Non–Contracting Sensor Handles Demands of Road Sensing of Suspension" reprinted Design News, Mar. 1993.

(List continued on next page.)

*Primary Examiner*—Walter E. Snow

[57] ABSTRACT

An valve position sensor apparatus for measuring the linear position of an EGR valve including a valve stem portion is disclosed. The apparatus comprises an elongated sensor probe extending from a base and a tubular member slideably overlying a varying length of the probe. The base is adapted to be secured relative to the EGR valve. The probe includes parallel, spaced apart, coextensive primary and secondary windings having a transformer coupling. The tubular member is movable with the EGR valve stem and is comprised of a material adapted to alter the transformer coupling of the overlied windings. An AC signal is supplied to the primary winding thereby inducing a signal in the secondary winding, the magnitude of the induced signal being dependent on the transformer coupling. An output means monitors the signal induced in the secondary winding and provides an output signal related to the linear position of the EGR valve.

19 Claims, 3 Drawing Sheets

U.S. PATENT DOCUMENTS

| | | |
|---|---|---|
| 4,408,159 | 10/1983 | Prox . |
| 4,502,006 | 2/1985 | Goodwin et al. . |
| 4,658,153 | 4/1987 | Brosh et al. . |
| 4,663,589 | 5/1987 | Fiori, Jr. . |
| 4,665,372 | 5/1987 | Schwartz . |
| 4,723,446 | 2/1988 | Saito et al. . |
| 4,742,794 | 5/1988 | Hagstrom . |
| 4,797,614 | 1/1989 | Nelson . |
| 5,027,781 | 7/1991 | Lewis ................................. 123/568 |
| 5,036,275 | 7/1991 | Munch et al. . |
| 5,150,615 | 9/1992 | Rymut et al. . |
| 5,210,490 | 5/1993 | Munch et al. . |
| 5,216,364 | 6/1993 | Ko et al. . |

OTHER PUBLICATIONS

EF Stefanides, Inductive Sensors Improve Automotive Position Sensing Design News, Oct. 3, 1988, pp. 256–275.

Roger Wells "Non–Contractracting Sensors: An Update Automotive Engineering" vol. 96, No. 11, Nov. 1988, pp. 39–45.

Undated product brochure for Nation Corporation Linear Position Valve Sensor (Part #400A02A).

Nation Corp. press release dated Mar. 1, 1983 for Nation's EGR Valve Positon Sensor.

Undated product brochure for Nation Corp's Non–Contact Linear Position Sensor.

Undated product Brochure for Nation Corp's Positions Velocity Sensor (Part #4114119).

Undated product brochure for Nation Corp's Positions Velocity Suspension Sensor (Part #411310).

Two page product brochure for Narton Corporation's Spool Valve Sensor and Control Sensor (P/N 3104088E–1), drawing dated Jul. 12, 1988.

Two Page product brochure for Narton Corporation's Spool Valve Sensor System (P/N 409968E–1), drawing dated Jul. 12, 1988.

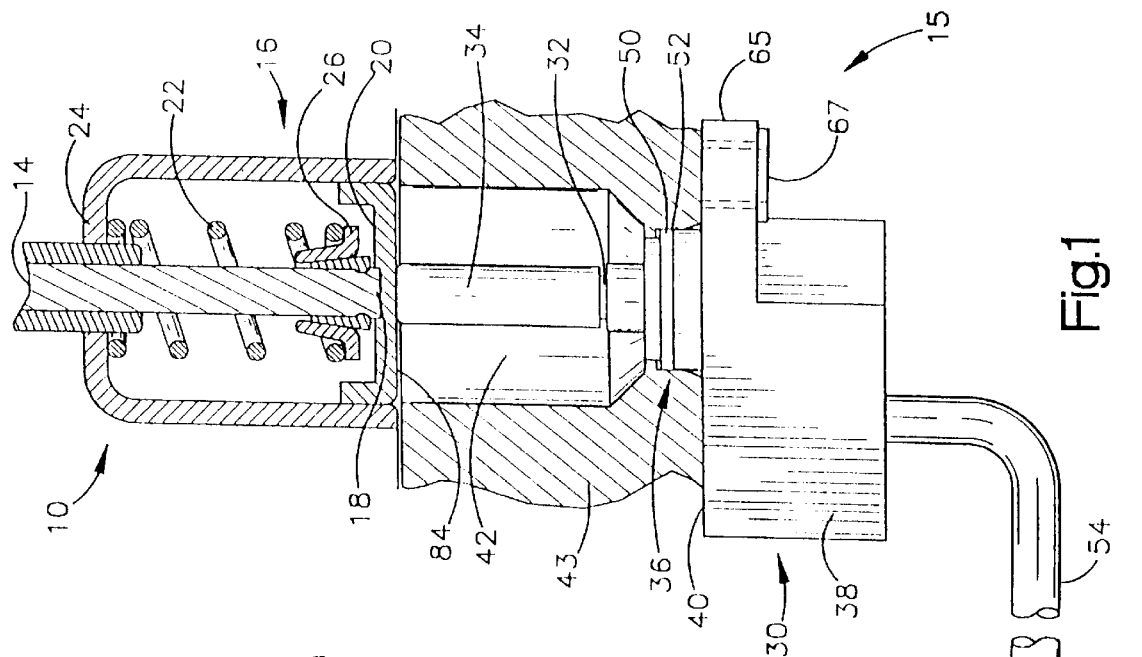
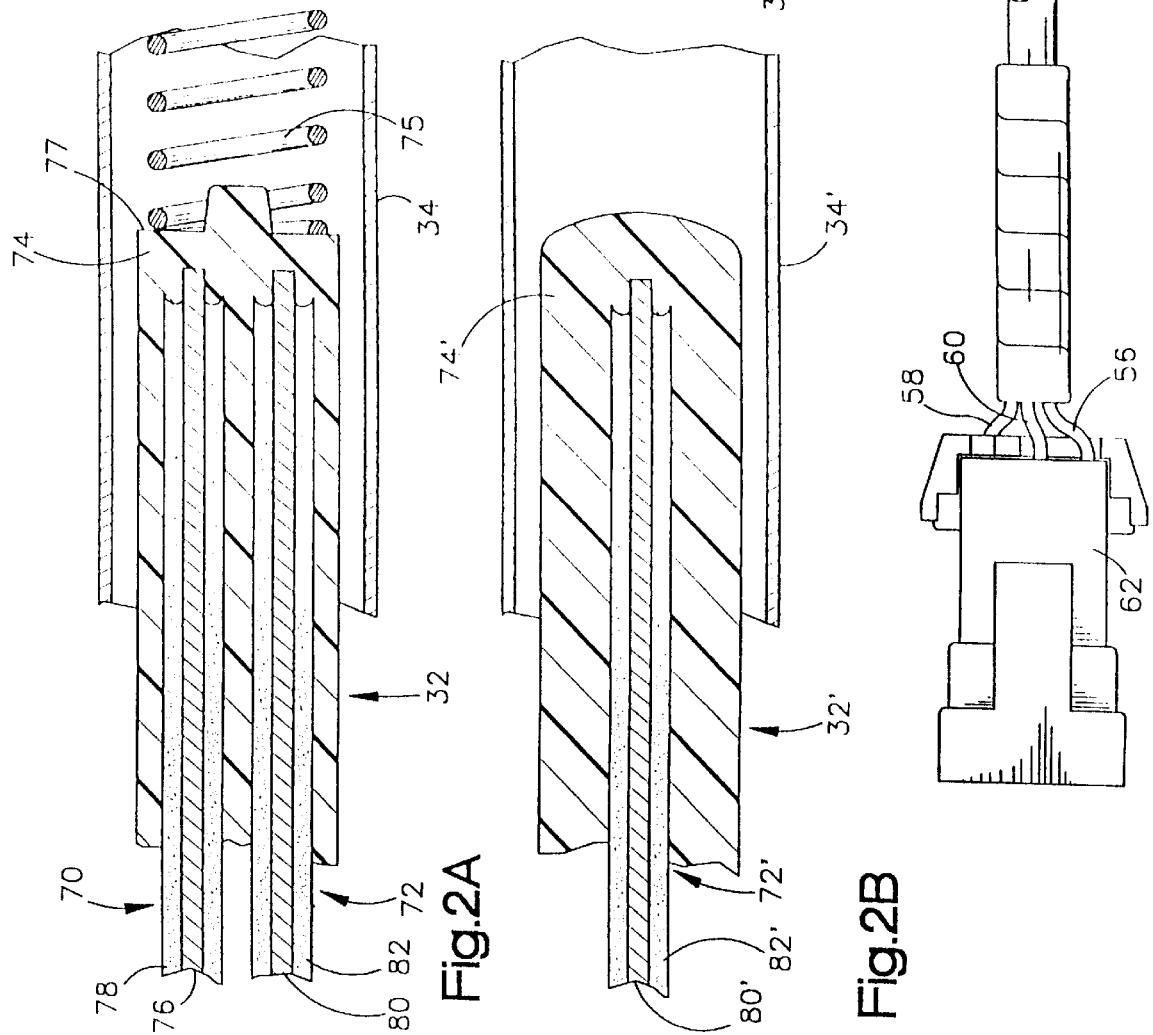

EGR VALVE LINEAR POSITION SENSOR HAVING VARIABLE COUPLING TRANSFORMER

RELATED APPLICATION

This is a continuation-in-part of application Ser. No. 08/069,127, now abandoned, filed May 28, 1993 which is a continuation of application Ser. No. 07/296,183 filed Jan. 11, 1989. Application Ser. No. 07/296,183 issued Jun. 1, 1993 as U.S. Pat. No. 5,216,364 entitled "Variable Transformer Position Sensor."

FIELD OF INVENTION

This invention relates to a position sensor for determining the linear position of an internal combustion engine exhaust gas recirculation (EGR) valve and more particularly to a linear position sensor having a variable coupling transformer.

BACKGROUND

EGR systems are widely used in internal combustion engine emission control systems to reduce the content of nitric oxide ($NO_x$) of the engine exhaust gas. An EGR system directs a portion of the exhaust gas from the exhaust manifold to the intake manifold of the engine. The combusted exhaust gas, having a depleted oxygen level, combines with the "fresh" intake air thereby reducing the oxygen content of the air-fuel mixture in the cylinder combustion chamber. The lower air-fuel mixture oxygen content reduces the combustion temperature of the mixture. The lower combustion temperature results in a reduction of the amount of nitric oxide produced as a byproduct of the combustion process.

The portion of the exhaust gas recycled to the intake manifold is determined by the position of an EGR valve actuator disposed within a housing which includes ports suitably connected to the intake and exhaust manifolds. A typical EGR valve actuator is supported by a valve body including a valve head at an end of the actuator and an elongated valve stem. The valve actuator moves longitudinally along a path of travel within the housing.

Various engine performance parameters, e.g., ignition timing, fuel/air ratio, etc., are controlled by an engine microprocessor. Among the input data required by the microprocessor to determine optimal performance parameter values under different driving conditions is the linear position of the EGR valve.

An EGR valve linear position sensor must be compact, extremely rugged and durable. It must be capable of accurate position determination under severe environmental conditions including wide temperature fluctuations from extremely cold ambient temperatures when the vehicle is parked to intense heat in the engine compartment when the vehicle is running. Vibration during vehicle movement, exposure to various vehicle and road fluids, chemicals and other contaminants may also degrade the sensor. The sensor must be reliable and provide consistent accuracy over the life of the sensor. Finally, to be successful in the marketplace, an EGR valve position sensor must be competitive in price with other sensors.

SUMMARY OF THE INVENTION

According to one aspect of the present invention, an EGR valve linear position sensor includes a stationary sensor probe and a moveable coupling adjustment member. The sensor probe includes a base and an elongated probe extending from the base. The elongated probe includes at least one winding wound around an elongated core. In accordance with a preferred embodiment of the invention, two spaced-apart coils include a multiplicity of turns spaced substantially along the entire length of their respective two cores. The cores are substantially coextensively positioned within the probe.

The base includes a valve engaging portion and an electronics housing. The EGR valve engaging portion fits into a cavity such that the elongated probe is substantially aligned with an EGR valve stem. The circuitry of the sensor is housed in the electronics housing portion of the base. Extending from the electronics housing portion is a cable having a plurality of electrical input and output wires. The electronics housing portion additionally includes flanged portions with apertures for mounting the base.

A coupling adjustment member in the form of a sleeve slideably overlies the elongated probe and is movable with the EGR valve stem. As the position of the EGR valve stem changes, the tubular member is displaced with respect to the sensor probe and a signal output from the one or more windings is altered.

The preferred position sensor further includes a signal input means and an output means. The input means is electrically coupled to a primary winding of the two windings to energize the primary winding with an AC signal. The output means is electrically coupled to a secondary winding of said two windings to measure the signal induced in the secondary winding, to correlate the induced signal with the linear position of the moveable coupling adjustment member and thus the EGR valve stem. An output signal to an engine control is dependent on the position of the EGR valve.

In accordance with a preferred embodiment of the invention, the radially wound coils provide the capability for adjusting or tuning the linearity of the sensor output by allowing the relative spacing between the coil turns to be controlled along the length of the core.

The EGR valve linear position sensor constructed in accordance with the present invention is: a) capable of accurate determination of the linear position of an EGR valve actuator; b) compact, requiring minimal space in the engine compartment; c) reliable and durable over time and under a wide range of environmental conditions; d) resistant to vehicle and environmental contaminants; and e) relatively inexpensive to manufacture.

These and other objects of the invention will be better understood from the description of the preferred embodiment which is described in conjunction with the accompanying drawings.

BRIEF DESCRIPTION OF THE DRAWINGS

FIG. 1 is a front view of a EGR valve linear position sensor constructed in accordance with the present invention showing the sensor secured to an EGR valve housing;

FIGS. 2A and 2B are fragmentary sectional views of a portion of the sensor probe and overlying tubular member of the linear position sensor of FIG. 1;

DETAILED DESCRIPTION

Figure 3:
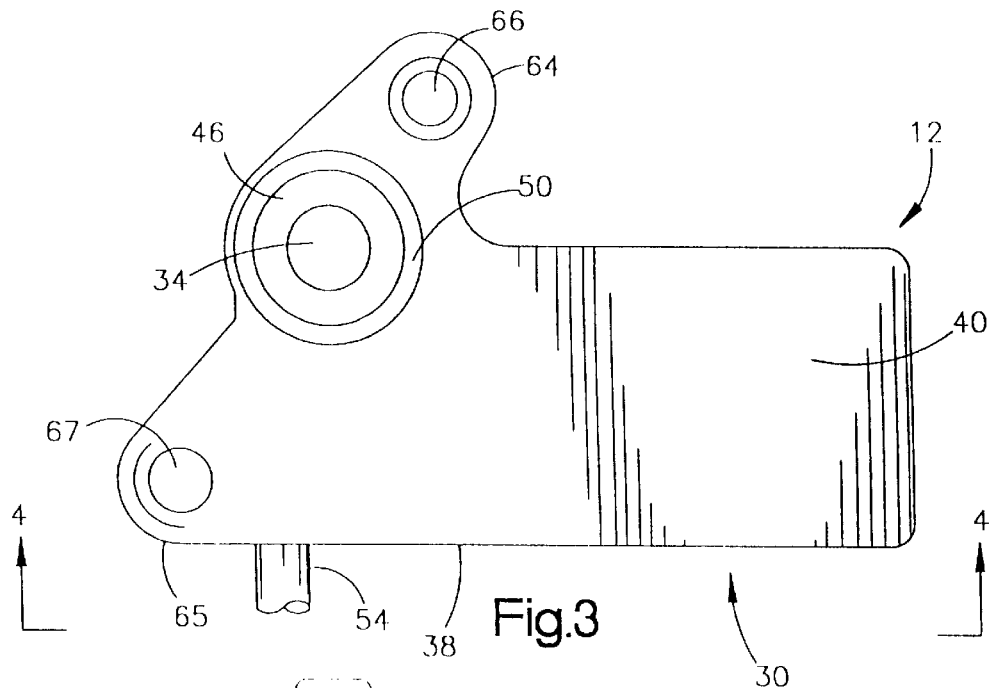
FIG. 3 is a plan view of a portion of the linear position sensor of FIG. 1.

Turning now to the drawings, FIG. 1 shows a portion of an EGR valve actuator, shown generally at 10, with an EGR valve linear position sensor constructed in accordance with the present invention, shown generally at 12, attached thereto. The EGR valve actuator 10 includes an EGR valve stem 14. The elongated valve stem 14 extends from an EGR valve head (not shown). The valve stem 14 and valve portion comprise an EGR valve body. The EGR valve actuator is disposed in a housing, shown generally at 16, and moves longitudinally within the housing 16 along a path of travel. Attached to the distal end 18 of the valve stem 14 is a valve stem cover 20 which moves in unison with the valve body within the confines of the housing 16. As shown in FIG. 1, the valve stem cover 20 is at a point of maximum outward displacement relative to housing 16. A biasing spring 22 is disposed between a turned in portion 24 of the housing 16 and a collar 26 affixed near the distal end 18 of the valve stem 14.

Figure 4:
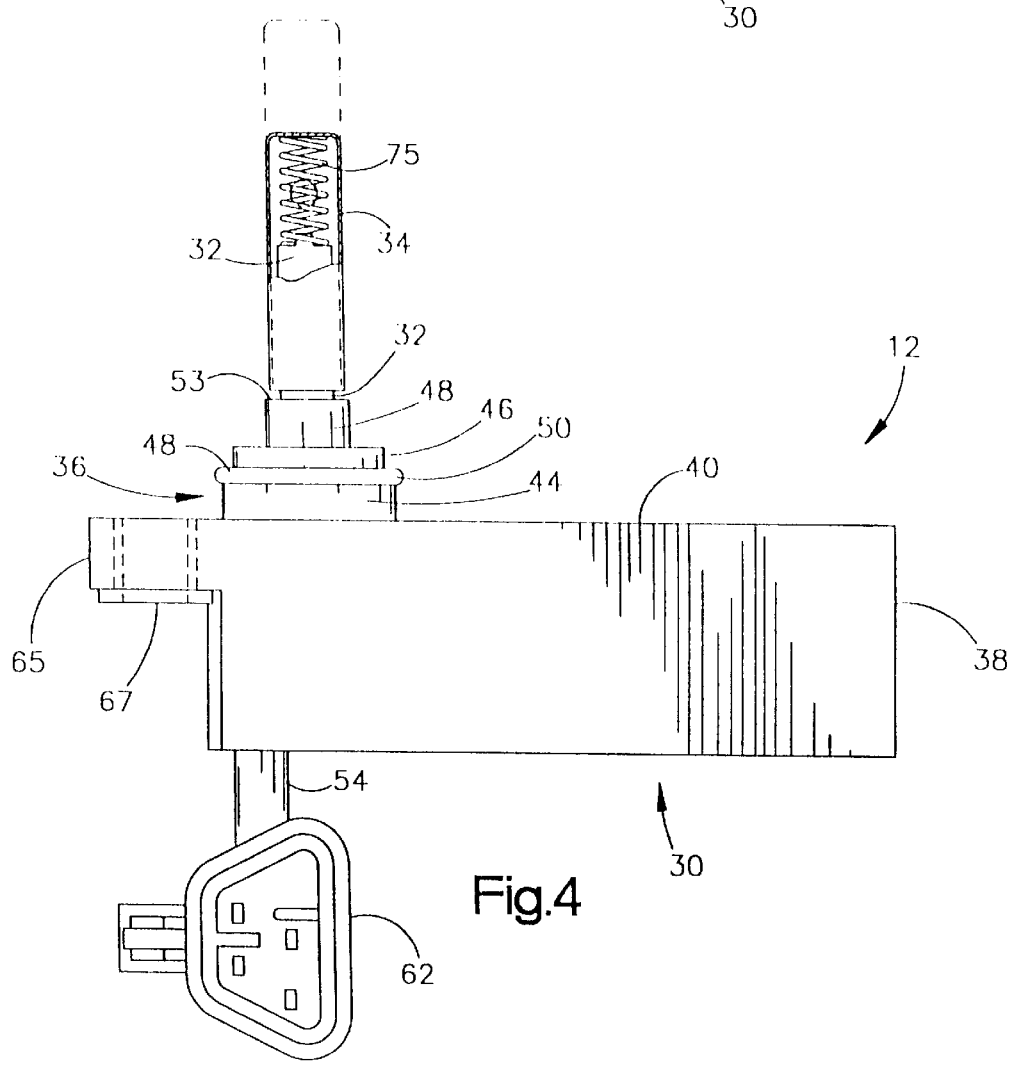
FIG. 4 is a front elevation view of the linear position sensor of FIG. 1 showing the displacement of the coupling tube in phantom.

As best can be seen in FIGS. 3 and 4, the EGR linear position sensor 12, includes a base 30, an elongated sensor probe 32 extending from the base 30 and a tubular member or sleeve 34. The base includes an EGR valve engaging portion 36 and an electronics control housing portion 38. The valve engaging portion 36 extends from an upper surface 40 of the electronics control housing portion 38 and is adapted to fit in a generally cylindrical cavity 42. The cavity 42 is defined by an EGR valve housing extension 43, which may or may not be integral with housing 16 (see FIG. 1).

The EGR valve engaging portion 36 is comprised of three cylindrical sections 44, 46 and 48, respectively, having differing diameters. The largest diameter section 44 comprises the base of the fitting portion, while the second largest diameter section 46 comprises the middle section and the smallest diameter section 48 comprises the top section. The differing outer diameters between the base 44 and middle 46 sections provide a seat for an O-ring 50. O-ring 50 encircles an outer peripheral surface of the middle section 46 and is sized to provide a snug fit with a mating inner surface 52 of the cavity 42 when the linear position sensor 12 is installed for operation. The O-ring 50 prevents loss of engine oil via the interface between the sensor 12 and the housing extension 43. The sensor probe 32 extends from an upper surface 53 of the smallest diameter section 48 which limits travel of the tubular member 34.

Figure 5:
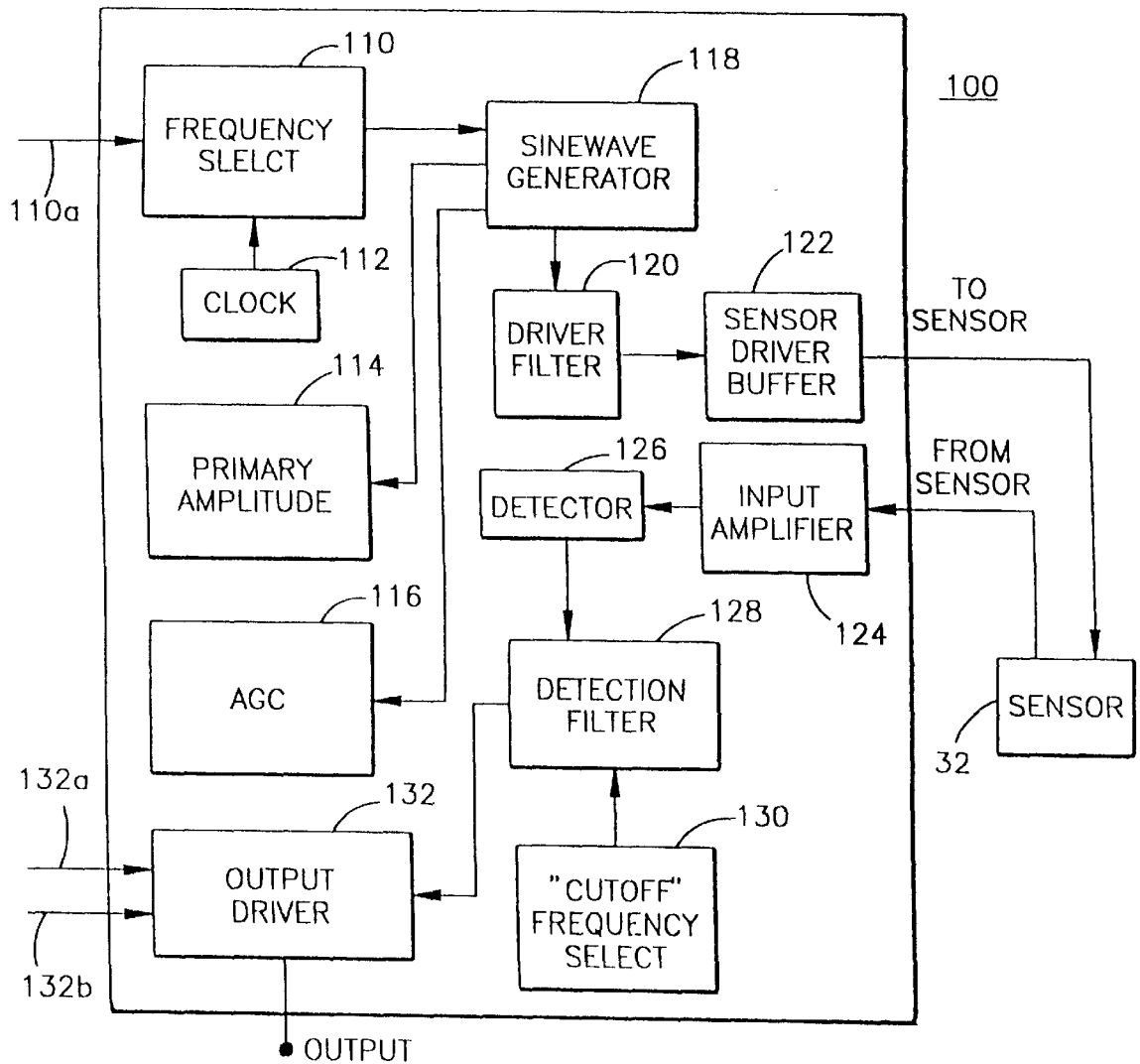
FIG. 5 is a schematic block diagram of circuitry for determining an EGR valve setting based upon a linear position of the coupling tube.

The electronics control housing portion 38 houses the control circuitry shown in FIG. 5 that evaluates outputs from the linear position sensor 12. The control circuitry used in the linear position sensor of the present invention is described generally below and is set forth in detail in U.S. Pat. No. 5,216,364 entitled "Variable Transformer Position Sensor," which is incorporated herein in its entirety by reference.

Extending from the electronics control housing portion 38 is an electrical cable 54 which includes input 56, output 58 and ground 60 wires. The cable terminates with an interface plug 62. Interface plug 62 is adapted to be connected to an interface plug of the engine microprocessor (not shown). The electronics control housing portion 38 also includes two flanges 64, 65 having apertures 66, 67. The apertures 66, 67 facilitate the attachment of the linear position sensor 12 to the EGR housing extension via bolts, rivets or other attachment means (not shown). The attachment of the linear position sensor 12 to the EGR housing extension 43 preferably aligns the sensor probe 32 with the valve stem 14.

As can best be seen in FIG. 2A, a preferred sensor probe 32 is comprised of a primary winding 70 and a secondary winding 72 which are configured as a transformer and mutually encapsulated within an encapsulating material 74. Primary and secondary windings 70 and 72 are coextensive, or side-by-side, and are generally mutually parallel and spaced apart. Primary winding 70 includes an elongated cylindrical core 76 and a coil 78 defined by a single magnet wire radially wound around core 76 over substantially the entire length of the core. Secondary winding 72 includes an elongated cylindrical core 80 having a coil 82 defined by a single magnetic wire radially wound around core 80 over substantially its entire length. In the preferred embodiment, cores 76 and 80 are 0.045-inch diameter ferromagnetic rods. The coils 78 and 82 include a double layer of 41-AWG wire, compactly wound on the associated core. Primary and secondary windings 70 and 72 are encapsulated by a material 74 which, preferably is Dow Corning Sil-Gard 170.

The tubular member 34 is spring loaded against a lower surface 84 of the valve stem cover 20 by a compression spring 75 (FIG. 2A) inside the tubular member. The valve stem 14 and the sensor probe 32 are generally co-axial and as the stem 14 moves, the sleeve 34 overlies a varying length of the sensor probe 32, including the primary and secondary windings 70, 72. As the EGR valve stem 14 moves along its path of travel within the housing 16, the tubular member 34 is displaced relative to the sensor probe 32 (see FIG. 4, showing two positions of the tubular member 34, one being in phantom) thereby changing the portion of the primary and secondary windings 70, 72 overlied by the tubular member 34. As the sleeve 34 overlies a greater extent of the probe, the spring 75 is compressed and continues to exert a restoring force on the sleeve 34 to maintain the sleeve in engagement with the valve stem cover.

As the sensor is assembled, the sleeve 34 is placed over the probe 32 with the spring 75 trapped between a closed end of the sleeve and an end 77 of the probe 32. With the stem 14 fully retracted and the sleeve 34 fully extended, the spring 75 is pre-loaded to withstand shock and vibration without movement. A preferred spring 75 is commercially available from multiple sources and has a spring constant of 1.72 pounds per inch.

A signal source 118 (FIG. 5) disposed in the electronics control housing portion 38 is electrically coupled to the primary winding 70 and the electrical input wire 56 to energize the primary winding with an AC signal of appropriate magnitude. The AC signal applied to the primary winding 70 creates a changing magnetic field emanating from the winding. The changing magnetic field induces a signal in the secondary winding 72. The magnitude of the induced signal is dependent upon the transformer coupling between the primary and secondary windings 70,72. Preferably, tubular member 34 is a transformer coupling enhancing member, such as aluminum or another nonferrous metal, which increases the transformer coupling between the primary and secondary windings as the tubular member 34 becomes more coextensive with the primary and secondary windings 70, 72.

To minimize the electrical supply requirements, the signal supplied to the primary winding may be limited such that essentially no signal is induced in the secondary winding 72 when the tubular member is displaced so that no portion of the windings are overlied. Additionally, the spacing of the radially wound coils 78, 82 may be varied appropriately to provide for an induced signal which is a linear function of EGR valve body position.

An input amplifier 124 contained in the electronics control housing portion 38, is electrically coupled to the secondary winding 72. The output signal means measures the signal induced in the secondary winding and correlates the induced signal with the linear position of the EGR valve body. The output signal means provides an output signal related to the linear position of the EGR valve body to the engine microprocessor (not shown) through output wire 58 and interface plug 62.

FIG. 5 illustrates components in block diagram form of an integrated circuit 100 for activating the probe 32. The integrated circuit 100 generates a constant amplitude monofrequency sinewave which can be used to drive the probe. The circuit 100 can be used with any sensor which transduces by providing an output derived from a sinewave input whose amplitude is modulated proportionately to the displacement of the sleeve 34. In the disclosed embodiment the probe is driven with a 12 KHz sinewave. An amplitude modulated output from the probe is fed back to a detection portion of the circuit 100 which demodulates the signal and produces an output voltage proportional to the signal amplitude which, in turn, is related to the displacement of the sleeve.

The circuit 100 includes a frequency select stage 110 that is controlled by a clock 112. An automatic gain control stage 116 acts upon and adjusts the sinewave generator output to track the primary amplitude select 114. Signals from the frequency select stage 110 and primary amplitude select stage 114, are supplied to a sinewave generator 118. The sinewave generator 118 sends a signal to a driver filter 120 which, in turn, sends a signal to a sensor driver buffer 122 with the resulting signal used as the output drive signal.

The action of a sensor is to modulate the drive signal with a signal proportional to the sleeve displacement. A return signal from the probe 32 is fed to an input amplifier 124 and then passes to a detector 126. The detector 126 demodulates the return signal. Various techniques are available for this demodulation and are known to those skilled in the art. Extraneous frequency components are removed by a low-pass detection filter 128 that is incorporated all or partially in output drive amplifier 132. The filter cut-off frequency is controlled by external components in the feedback loop of the output drive amplifier 132. The output drive amplifier 132 feedback network is further configured to achieve a "voltage follower" operation with gain and offset controlled by external components.

The clock signal from the clock 112 is reduced according to a frequency select input 110*a* by the frequency select stage 110. Frequency selection allows the circuit 100 to more closely match the requirements of a given sensor. Input from the amplitude setting stage 114 along with the frequency adjusted clock signal are passed to the sinewave generator 118. The sinewave generator then produces a sinewave of the desired frequency and amplitude. The sinewave is filtered at the driver filter 120 to reduce harmonic distortion and is then buffered at the sensor driver buffer stage 122. An output signal from the driver buffer stage 122 is then used to drive a sensor.

The return signal from a sensor is an amplitude modulated derivative of the sinewave signal used to drive the sensor. The modulation, in turn, is related to the sleeve displacement. The return signal is amplified by the input amplifier 124, and the resulting signal passed to the detector 126.

The effect of an amplitude modulating a sensor such as the probe 32 is to produce a "voltage vs. time" image of a "position vs. time" variation that is measured. However, the "voltage vs. time" image appears at a frequency range that has been shifted by a frequency equal to that of the sinusoid driving the sensor. The action of the detector 126 is to demodulate the sensor's output signal. Demodulation removes both the frequency shift and "reversed" spectra from the sensor signal. This results in a "voltage vs. time" variation that is directly proportional to the "position vs. time" variation that the sensor measured. The demodulated signal from the detector is then fed through a low-pass filter to remove any harmonics created by the demodulation. The cut-off frequency of the filter is set by a circuit 130. Numerous methods for amplitude demodulation and low-pass filtering are established in the field of electronics and are well documented in the associated literature.

The filtered signal is then passed to the output driver 132. The final output is a voltage signal from the driver 132 that is scaled appropriately by external gain and offset setting inputs 132*a*, 132*b*.

Figure 6:
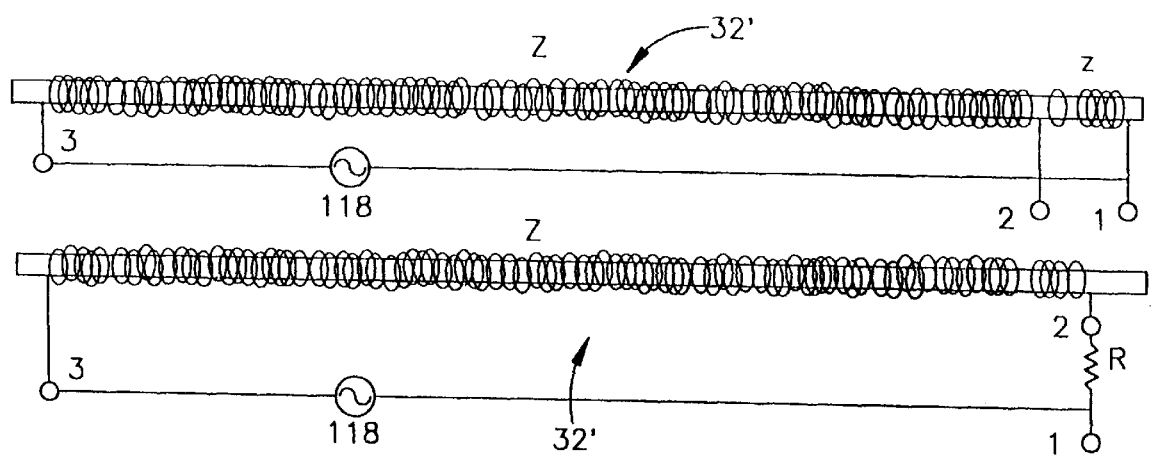
FIG. 6 shows a single elongated coil coupled to an energy source for energizing the coil.

A single coil design of the present invention is shown in 2B. In this embodiment, a single winding 72' has a multi-turn coil 82' wrapped around a center core 80'. The single winding 72' is encapsulated in a material 74' and is covered by a continuously variable length of a coupler 34'. An AC voltage is applied to ends of the single winding 72' as shown in FIG. 6. Feedback control is then used to maintain a constant AC voltage between points 1 and 2. In the topmost example in FIG. 6, an impedance z exists between points 1 and 2. In the bottom example, a resistance R exists between points 1 and 2. The first case has the advantage of z varying ratiometrically with Z (long coil portion impedance) over temperature due to the common magnetic core 80' in both Z and z. In the second case a resistor R is substituted for the coil z.

With a constant magnitude alternating current voltage $V_{12}$ maintained between contacts 1 and 2, the voltage between points 2 and 3 is given by the five equations below:

$$V_{12} = \text{constant}$$

$$V_{12} = I \cdot z \qquad\qquad V_{12} = I \cdot R$$

$$V_{23} = Z \cdot \frac{V_{12}}{z} \qquad\qquad V_{23} = Z \cdot \frac{V_{12}}{R}$$

As can be seen, $V_{23}$ is linear in Z. Z in turn will vary when a coupling tube 34' is brought over the long portion of the coil. By appropriate choice of winding profile, it is possible to control the relationship between Z and the degree to which the large coil is covered by a coupling tube or sleeve.

In the constant Voltage Design, a constant magnitude alternating current voltage is maintained between points 1 and 3. The voltage $V_{23}$ between points 2 and 3 is then given by the following equations. The relation for $V_{23}$ can be linearized by requiring z>>Z or R>>Z. However, this will result in a comparatively low value for $V_{23}$ as the bulk of the voltage will then be across $V_{12}$. The effect of making z or R comparatively large is to make a low level constant current drive.

$$V_{13} = \text{constant}$$

$$V_{13} = I \cdot (z + Z) \qquad V_{13} = I \cdot (R + Z)$$

$$V_{23} = \frac{V_{13} \cdot Z}{(z + Z)} \qquad V_{23} = \frac{V_{13} \cdot Z}{(R + Z)}$$

The control module 110 must be modified slightly to include a feedback connection between the control connections 1,2 and the sine wave generator 118. As the voltage across the connections 1,2 varies in magnitude, the output from the generator 118 is adjusted to maintain the signal.

While the present invention has been described herein in some degree of particularity, it is to be understood that those of ordinary skill in the art may make certain additions or modifications to, or deletions from, the described present embodiment of the invention without departing from the spirit or scope of the invention, as set forth in the appended claims.

We claim:

1. A valve position sensor for measuring a linear position of a valve actuator supported by a valve body including a valve head at an end of the actuator and an elongated valve stem extending from the valve head, the valve actuator being movable along a longitudinal path of travel, the sensor comprising:
   a) a sensor probe means comprising an elongated sensor probe and a base, the sensor probe extending from the base and including at least one elongated conductor winding wound radially around an elongated core encapsulated within a portion of the sensor probe, the base adapted to be secured relative to the valve body such that the sensor probe is substantially aligned with the valve stem;
   b) an impedance modification member comprising a tubular member moveable with the valve actuator and slideably overlying a varying length section of the sensor probe including a portion of the elongated winding, the length of the sensor probe section overlied being dependent on the linear position of the valve actuator, an impedance of the elongated winding varying with the portion of the winding overlied by the tubular member;
   c) a signal input means electrically connected to energize said winding with a time-varying signal, thereby producing a signal in the elongated winding, a magnitude of an output signal from the winding dependent upon the portion of the winding overlied by the tubular member; and
   d) an output means electrically connected to the sensor probe means and adapted to monitor the output signal to correlate the output signal with the linear position of the valve actuator.

2. The sensor apparatus of claim 1 wherein the sensor probe comprises primary and secondary conductor windings that are each wound radially around an elongated core.

3. The sensor apparatus of claim 2 wherein the primary and secondary conductor windings have a non-constant coil spacing around their respective cores such that the signal induced in the secondary conductor winding is a linear function of the position of the valve actuator.

4. The sensor apparatus of claim 1 wherein the sensor probe base includes a flanged portion adapted to attach the valve position sensor to a housing surrounding the valve body such that the sensor probe is substantially aligned with the valve stem and wherein the base further includes an O-ring seated on an outer peripheral surface of the base, the O-ring coacting with an inner cylindrical surface of the housing to form a seal to prevent fluid loss from the housing.

5. The sensor apparatus of claim 2 wherein a magnitude of the signal induced in the secondary winding is substantially zero when the tubular member does not overlie any portion of the primary and secondary windings.

6. A variable coupling sensor adapted to sense a linear position of an EGR valve having an elongated valve stem, the sensor comprising:
   a) a base portion adapted to be secured relative to the EGR valve;
   b) an elongated probe extending from the base portion, the probe including parallel, coextensive, spaced apart primary and secondary windings, the windings having a transformer coupling, the probe being aligned with the valve stem;
   c) a sleeve movable with the valve stem and slideably overlying a varying length of the probe including at least a portion of the primary and secondary windings, the sleeve comprised of a non-ferrous material adapted to increase the transformer coupling of the portion of the primary and secondary windings overlied by the sleeve;
   d) an AC signal input means to energize the primary winding thereby inducing a signal in the secondary winding, a magnitude of the signal induced related to the transformer coupling of the primary and secondary winding; and,
   e) an output means electrically connected to the secondary winding, the output means adapted to emit a signal corresponding to the linear position of the EGR valve.

7. The sensor of claim 6 wherein an end of the sleeve moves back and forth with an EGR valve stem cap.

8. The sensor of claim 6 wherein the sensor probe primary and secondary windings each include an elongated core and a coil radially wound around the core.

9. The sensor of claim 8 wherein the primary and secondary windings have a non-constant coil spacing around their respective cores such that the signal induced in the secondary coil is a linear function of the position of the EGR valve.

10. The sensor of claim 6 wherein the sensor probe means base includes a flanged portion adapted to attach the sensor to a housing surrounding the EGR valve such that the sensor probe is substantially aligned with the EGR valve stem and wherein the base further includes an O-ring seated on an outer peripheral surface of the base, the O-ring coacting with an inner cylindrical surface of the housing to form a seal.

11. The sensor of claim 6 wherein the magnitude of the signal induced in the secondary winding is substantially zero when the sleeve does not overlie any portion of the primary and secondary windings.

12. The sensor of claim 6 wherein the sleeve is comprised of aluminum.

13. A valve position sensor for measuring a linear position of a valve actuator supported by a valve body including a valve head at an end of the actuator and an elongated valve stem extending from the valve head, the valve actuator being movable along a longitudinal path of travel, the sensor comprising:
   a) a sensor probe means comprising an elongated sensor probe and a base, the sensor probe extending from the base and including elongated primary and secondary windings which in combination provide a transformer encapsulated within a portion of the elongated sensor probe, the windings being substantially parallel, coextensive, and spaced apart and the base adapted to be secured relative the valve body with the elongated sensor probe substantially aligned with the valve stem;

b) a transformer coupling adjustment means supported for movement with the valve stem and comprising a non-ferrous tubular member slideably overlying a section of the elongated sensor probe including at least a portion of the primary and secondary windings to change a transformer coupling of the primary and secondary windings as the valve stem moves along the path of travel;

c) a signal input means electrically coupled to energize said primary winding with an AC signal thereby inducing a signal in the secondary winding, the induced signal dependent upon the transformer coupling between the primary and secondary windings; and, d) an output means electrically coupled to the secondary winding adapted to monitor the signal induced in the secondary winding and provide an output signal related to the linear position of the valve stem.

14. The apparatus of claim 13 wherein an end of the tubular member moves with a cap overlying a distal end of the valve stem.

15. The apparatus of claim 13 wherein the sensor probe primary and secondary windings each include an elongated core and a coil radially wound around the core.

16. The apparatus of claim 15 wherein the primary and secondary windings have a non-constant coil spacing around their respective cores such that the signal induced in the secondary coil is a linear function of the position of the EGR valve.

17. The apparatus of claim 13 wherein the sensor probe means base includes a flanged portion adapted to attach the apparatus to a housing surrounding the valve stem such that the sensor probe is substantially aligned with the valve stem and wherein the base further includes an O-ring seated on an outer peripheral surface of the base, the O-ring coacting with an inner cylindrical surface of the housing to form a seal to restrict fluid from exiting the housing.

18. The apparatus of claim 13 wherein the magnitude of the signal induced in the secondary winding is substantially zero when the tubular member does not overlie any portion of the primary and secondary windings.

19. The apparatus of claim 13 wherein the tubular member is comprised of aluminum.

* * * * *